United States Patent Office 3,290,287
Patented Dec. 6, 1966

---

3,290,287
17-OXYGENATED (OPTIONALLY N-ALKYLATED) 2-AZAANDROSTAN-3-ONES, 4-DEHYDRO DERIVATIVES THEREOF, AND A-HOMO COMPOUNDS CORRESPONDING
Robert H. Mazur, Deerfield, and Raphael Pappo, Skokie, Ill., assignors to G. D. Searle & Co., Chicago, Ill., a corporation of Delaware
No Drawing. Filed Feb. 17, 1964, Ser. No. 345,085
20 Claims. (Cl. 260—239.3)

This application is a continuation-in-part of our copending application Serial No. 189,260, filed April 23, 1962, now abandoned.

The present invention relates to novel steroidal lactams and, more particularly, to A ring lactams of the androstane series wherein the A ring is optionally 6- or 7-membered. These compounds are represented by the structural formula

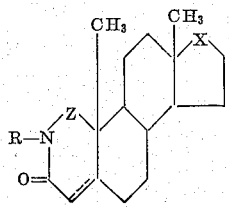

wherein X can be a carbonyl, β-hydroxymethylene, α-(lower alkyl)-β-hydroxymethylene, β-lower alkanoyl) oxymethylene, or α-(lower alkyl)-β-(lower alkanoyl) oxymethylene radical, Z is a methylene or ethylene radical, R can be hydrogen or a lower alkyl or lower alkanoyl radical, and the dotted line indicates the optional presence of a doubly-bonded linkage between carbon atom 5 and the adjacent A ring carbon atom.

The lower alkyl radicals represented in the X and R substituents are exemplified by methyl, ethyl, propyl, butyl, pentyl, hexyl, and the branched-chain isomers thereof, and the lower alkanoyl radicals symbolized by those terms are, typically, formyl, acetyl, propionyl, butyryl, valeryl, caproyl, and the branched-chain radicals isomeric therewith.

Suitable starting materials for the manufacture of the 6-membered ring lactams of the 5α-androstane series are illustrated by the structural formula

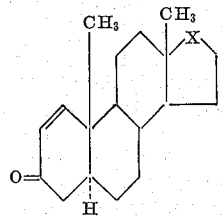

wherein X is a carbonyl, β-hydroxymethylene, β-(lower alkanoyl)oxymethylene, or α-(lower alkyl)-β-hydroxymethylene radical. These 17-oxygenated androst-1-en-3-ones are allowed to react with lead tetraacetate in the presence of osmium tetroxide or, alternatively, with ozone in an organic solvent medium to afford the corresponding 17-oxygenated 1-oxo-1,2-seco-A-nor-5α-androstan-2-oic acids of the structural formula

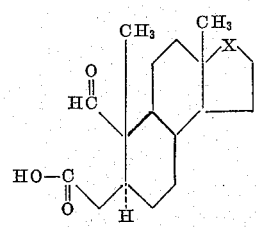

wherein X has the identical meaning defined above. Reaction of these intermediates with ammonia and hydrogen in the presence of a suitable hydrogenation catalyst affords the corresponding 2-aza-5α-androstan-3-ones of this invention. Suitable catalysts are, for example, Raney nickel, palladium, and platinum oxide. This hydrogenation process is preferably conducted at a temperature of about 90–100° and at a pressure of about 1500–2500 pounds per square inch. A specific example of these processes is the reaction of 17β-hydroxy-17α-methyl-5α-androst-1-en-3-one with lead tetraacetate and osmium tetroxide in aqueous acetic acid to yield 17β-hydroxy-17α-methyl-1-oxo-1,2-seco-A-nor-5α-androstan-2-oic acid, which is shaken with aqueous ammonia and hydrogen in the presence of Raney nickel catalyst at 90–100° and 2400 pounds per square inch inital hydrogen pressure to produce 17β-hydroxy-2-aza-17α-methyl-5α-androstan-3-one.

A second example of the 5α-androstane 6-membered ring lactams is 17β-hydroxy-2-aza-5α-androstan-3-one, which is produced by allowing 17β-acetoxy-1-oxo-1,2-seco-A-nor-5α-androstan-2-oic acid to react with ammonia and hydrogen by the aforementioned process. The latter intermediate is obtained by the reaction of 17β-acetoxy-androst-1-en-3-one with ozone in a methylene chloride-methanol solvent medium.

A process particularly suitable for the manufacture of the instant 6-membered ring lactams of the androst-4-ene series involves the reaction of a 17-oxygenated A-nor-androst-3-en-2-one of the structural formula

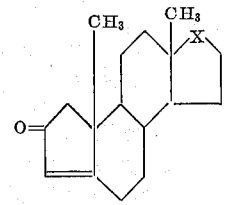

wherein X has the identical meaning as that described above, with hydroxylamine hydrochloride to form the corresponding oxime, followed by reaction with a rearrangement reagent of the group exemplified by sulfuric acid, hydrochloric acid, benzene sulfonyl chloride, thionyl chloride, and aluminum chloride. Typically, 17β-hydroxyandrost-3-en-2-one, which is represented by the structural formula

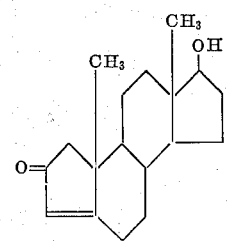

is converted to its 17-acetate by reaction with acetic anhydride in pyridine, and that ester is allowed to react with hydroxylamine hydrochloride to produce the corresponding oxime. This oxime is contacted with thionyl chloride in dioxane to afford 17β-acetoxy-2-azaandrost-4-en-3-one. Hydrolysis of this ester by reaction with aqueous potassium hydroxide in methanol results in the parent alcohol, 17β-hydroxy-2-azaandrost-4-en-3-one.

Reaction of the aforementioned 17β-hydroxy-2-aza-5α-androstan-3-one in acetone with aqueous chromic acid produces the instant 2-aza-5α-androstane-3,17-dione.

The 7-membered ring lactams of the present invention are conveniently prepared from 17-oxygenated androst-4-en-3-ones, represented by the structural formula

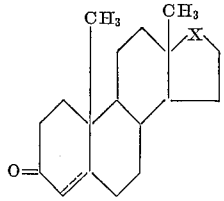

wherein X is a member of the class consisting of β-hydroxymethylene, β-(lower alkanoyl)oxymethylene, α-(lower alkyl)-β-hydroxymethylene, and α-(lower alkyl)-β-(lower alkanoyl)oxymethylene radicals. Reaction of these materials with hydroxylamine affords the corresponding oximes, which intermediates are subjected to a chemical rearrangement to produce the 17-oxygenated 3-aza-A-homoandrost-4a-en-4-ones of the present invention. These processes are illustrated below:

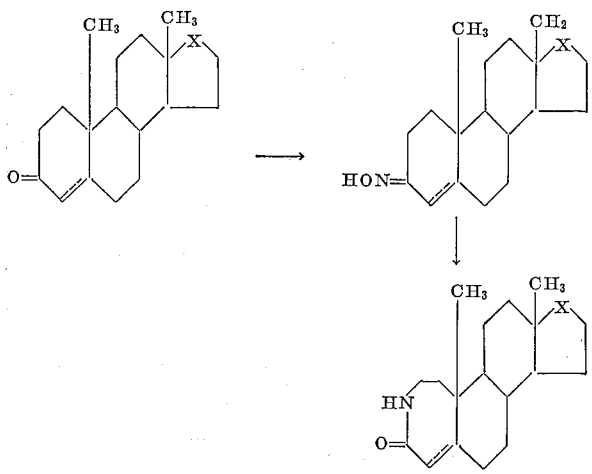

The symbol X represents a β-hydroxymethylene, β-(lower alkanoyl)oxymethylene, α-(lower alkyl)-β-hydroxymethylene, or α-(lower alkyl)-β-(lower alkanoyl)oxymethylene radical. A specific example of these processes is the reaction of 17β-acetoxy-17α-methylandrost-4-en-3-one, with hydroxylamine hydrochloride in aqueous pyridine, to afford the corresponding oxime, which substance is contacted with thionyl chloride in dioxane, resulting in 17β - acetoxy - 3 - aza - 17α - methyl - A - homoandrost-4a-en-4-one. Other reagents suitable for the latter rearrangement are exemplified by sulfuric acid, hydrogen chloride, benzenesulfonyl chloride, and aluminum chloride.

When this rearrangement is applied to the 5α-androstane intermediates, a second product is produced wherein the keto and imino groups are interchanged. For example, 17β-acetoxy-17α-methyl-5α-androstan-3-one oxime, formed by reaction of the parent ketone with hydroxylamine hydrochloride, is contacted with thionyl chloride and dioxane to afford a mixture containing 17β-acetoxy - 3 - aza - 17α - methyl - A - homo - 5α - androstan-4-one and 17β-acetoxy-4-aza-17α-methyl-A-homo-5α-androstan-3-one. Hydrolysis of this mixture with methanolic potassium hydroxide followed by purification by means of crystallization and chromatography affords 3 - aza - 17β - hydroxy - 17α - methyl - A - homo - 5α-androstan-4-one and 4-aza-17β-hydroxy-17α-methyl-A-homo-5α-androstan-3-one.

The 7-membered ring lactams of the 5α-androstane series can be manufactured, alternatively, by reaction of the aforementioned corresponding Δ⁴ᵃ compounds with a suitable reducing agent. The instant 3-aza-17β-hydroxy-17α-methyl-A-homoandrost-4a-en-4-one, typically, is contacted with lithium and liquid ammonia in tetrahydrofuran-tertiary-butyl alcohol to yield 3-aza-17β-hydroxy-17α-methyl-A-homo-5α-androstan-4-one.

The N-alkylated compounds of the present invention can be produced directly by alkylation of the corresponding unsubstituted lactams. A convenient procedure involves the use of an alkyl halide in the presence of a suitable acid acceptor. As a specific example, 2-aza-17β-hydroxy-17α-methyl-5α-androstan-3-one is contacted with ethyl iodide and potassium tertiary-butoxide in tertiary butanol to yield 2-aza-N-ethyl-17β-hydroxy-17α-methyl-5α-androstan-3-one. The suitability of this process for the production of N-alkyl-A-homo-lactams is demonstrated by the reaction of 3-aza-17β-hydroxy-17α-methyl-A-homoandrost-4a-en-4-one with methyl iodide and potassium tertiary-butoxide in tertiary-butanol to afford 3 - aza - 17β - hydroxy - N,17α - dimethyl - A - homoandrost-4a-en-4-one. An alternate process available for the manufacture of the N-alkyl derivatives possessing a 6-membered A-ring involves reductive amination of the 17-oxygenated 1-oxo-1,2-seco-A-nor-5α-androstan - 2 - oic acids described hereinbefore. The reaction of 17β-hydroxy - 17α - methyl - 1 - oxo - 1,2 - seco - A - nor - 5α-androstan-2-oic acid with methylamine and hydrogen in the presence of a suitable hydrogenation catalyst such as Raney nickel results in 2-aza-17β-hydroxy-N,17α-dimethyl-5α-androstan-3-one.

The instant N-acyl derivatives can be produced by direct acylation of the corresponding N-unsubstituted lactams, typically with a lower alkanoic acid anhydride or halide in the presence of a suitable acid acceptor. For example, 2-aza-17β-hydroxy-5α-androstan-3-one is heated with a mixture of acetic anhydride in pyridine to effect acylation of both the aza and hydroxy functions, thus producing 17β - acetoxy - N-acetyl-2-aza-5α-androstan-3-one. When that reaction is carried out at room temperature, on the other hand, only the hydroxy function is affected. At the lower reaction temperature, 2-aza-17β-hydroxy-5α-androstan-3-one thus produces 17β-acetoxy-2-aza-5α-androstan-3-one. Similarly, in the case of the N-alkyl lactams, acylation affords the 17-acyloxy compound. As a specific example, 2-aza-17β-hydroxy-N-methyl-5α-androstan-3-one, when contacted with acetic anhydride and pyridine, suitably at room temperature, yields 17β-acetoxy-2-aza-N-methyl-5α-androstan-3-one.

The compounds of this invention display valuable pharmacological properties. They are hormonal agents, for example, as is evidenced by their anabolic and androgenic activity.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

To a solution of 6.36 parts of 17β-hydroxy-17α-methyl-5α-androst-1-en-3-one in 95 parts of acetic acid and 12 parts of water is added 40 parts of lead tetraacetate and 0.6 part of osmium tetroxide. This mixture is stored at room temperature for about 24 hours, then is treated with 2 parts of lead tetraacetate. Evaporation to dryness at reduced pressure affords a residue which is extracted with benzene. The benzene extract is washed with water and extracted with aqeuous potassium bicarbonate. The aqueous extract is washed with ether, acidified with dilute sulfuric acid, then is extracted with ethyl acetate-benzene. This organic extract is washed with water, dried over anhydrous sodium sulfate, and concentrated to dryness in vacuo.

To a solution of the residual crude product in 20 parts of pyridine is added 10 parts of 20% aqueous sodium bisulfite, and the mixture is stirred for about 20 minutes at room temperature. This mixture is then diluted with water, washed with ethyl acetate, acidified with dilute sulfuric acid, and finally extracted with benzene. The benzene extract is washed with water, dried over anhydrous sodium sulfate, and evaporated to dryness at reduced pressure to produce crude 17β-hydroxy-17α - methyl 1 oxo - 1,2 - seco - A - nor-5α-androston-2-oic acid, which after recrystallization from aqueous isopropyl alcohol, melts at about 166–173° (dec.).

The substitution of an equivalent quantity of 17α-ethyl-17β-hydroxy-5α-androst-1-en-3-one in the process of this example results in 17α-ethyl-17β-hydroxy-1-oxo-1,2-seco-A-nor-5α-androstan-2-oic acid.

*Example 2*

A mixture of 30 parts of 17β-hydroxy-17α-methyl-1-oxo-1,2-seco-A-nor-5α-androstan-2-oic acid, 570 parts of a 1:1 mixture of concentrated ammonium hydroxide and water and 18 parts of Raney nickel catalyst is heated at 90–100° in an atmosphere of hydrogen at about 2400 pounds per square inch pressure for a period of about 16 hours. The mixture is cooled and the insoluble portion is collected by filtration. This solid material is thoroughly washed with concentrated ammonium hydroxide then with isopropyl alcohol and is finally extracted with chloroform. The chloroform extract is filtered to remove insoluble material then is evaporated to dryness. Recrystallization of the residual solid from chloroform affords pure 2-aza-17β-hydroxy-17α-methyl-5α-androstan-3-one, which melts at about 305–307° and is represented by the formula

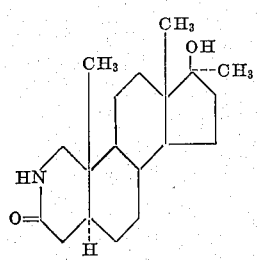

By substituting an equivalent quantity of 17α-ethyl-17β - hydroxy - 1-oxo-1,2-seco-A-nor-5α-androstan-2-oic acid and otherwise proceeding according to the processes of this example, 2-aza-17α-ethyl-17β-hydroxy-5α-androstan-3-one is obtained.

*Example 3*

A mixture of 20 parts of 17β-acetoxy-5α-androst-1-en-3-one in 134 parts of methylene chloride containing 160 parts of methanol is cooled to about −70°, and a stream of oxygen containing 6–8% of ozone is bubbled through the mixture until a blue color persits. The ozone addition requires about 30 minutes. The reaction mixture is purged of excess oxidant by means of a stream of nitrogen; then a solution of 6 parts of sodium hydroxide in 75 parts of water is added. The resulting aqueous mixture is washed with methylene chloride, then is acidified with concentrated hydrochloric acid. The acidified mixture is extracted with methylene chloride and the organic layer is washed successively with water and saturated aqueous sodium chloride, then is dried over anhydrous sodium sulfate and is stripped of solvent at reduced pressure. The resulting solid residue is 17β-acetoxy-1-oxo-1,2-seco-A-nor-5α-androstan-2-oic acid.

*Example 4*

To a solution of 10 parts of 17β-acetoxy-1-oxo-1,2-seco-A-nor-5α-androstan-2-oic acid in 133 parts by volume of concentrated aqueous ammonium hydroxide containing 67 parts by volume of methyl alcohol is added 9 parts of Raney nickel, and the resulting reaction mixture is shaken in a hydrogen atmosphere at about 100° and about 2000 pounds per square inch pressure for about 16 hours. The mixture is then cooled and filtered, and the filter cake is washed with concentrated aqueous ammonium hydroxide, then is extracted with boiling isopropyl alcohol. Evaporation of the solvent under reduced pressure affords crude 2-aza-17β-hydroxy-5α-androstan-3-one. Recrystallization from ethanol affords a pure sample, which melts at about 265–270°. This compound is represented by the formula

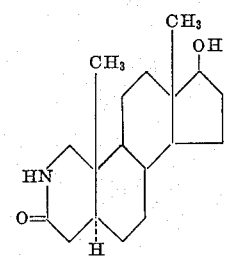

*Example 5*

A solution of one part of 2-aza-17β-hydroxy-5α-androstan-3-one in 320 parts of acetone is treated dropwise with 1.2 parts by volume of an aqueous solution, 8 N in chromium trioxide and 8 N in sulfuric acid. The excess reagent is decomposed by the addition of a small amount of isopropyl alcohol, and the volatile materials are removed by distillation under reduced pressure. The resulting residue is diluted with water, stored at room temperature for about 16 hours, then mixed with dilute aqueous sodium hydroxide and extracted with chloroform. The chloroform layer is separated and evaporated to dryness. The resulting residue is extracted with ethanol, and the ethanol extract is filtered, then concentrated to dryness at reduced pressure to afford a residue. Recrystallization of this residue from methanol yields pure 2-aza-5α-androstane-3,17-dione, M.P. about 262–266°. This substance is characterized by the formula

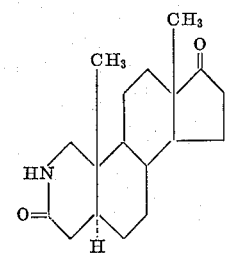

*Example 6*

To a mixture of 10.4 parts of pyridine and 100 parts of ethanol is added 17.2 parts of 17β-propionoxy-androst-4-en-3-one and 4.5 parts of hydroxylamine hydrochloride. The resulting solution is heated at reflux for about 1½ hours, then is concentrated to a small volume at reduced pressure. Dilution with water results in precipitation of the crude product, melting at about 169–176°. Recrystallization from methanol affords pure 17β-propionoxyandrost-4-en-3-one oxime, obtained as needle-like crystals, M.P. about 117–183°.

*Example 7*

To a solution of 14.4 parts of 17β-propionoxy-androst-4-en-3-one oxime in 350 parts of purified dioxane is added, with stirring and cooling by means of an ice-bath, 24.6 parts of thionyl chloride, keeping the temperature below 15°. The solution is stored at room temperature for about one hour, then is stirred vigorously with about 350 parts of 2 N aqueous potassium bicarbonate, and this aqueous mixture is extracted with ethyl acetate. The organic layer is washed twice with dilute aqueous sodium sulfate, is dried over anhydrous sodium sulfate, and is then stripped of solvent at reduced pressure. The resulting residue is absorbed on a silica gel chromatographic column, and the column is developed with mixtures of ethyl acetate in benzene and finally with the pure ethyl acetate. The 100% ethyl acetate elute is concentrated to dryness at reduced pressure, and this residue is crystallized from aqueous methanol to produce 3-aza-17β-propionoxy-A-homoandrost-4a-en-4-one, which melts at about 237–238°, and is further characterized by an ultraviolet maximum at about 220 millimicrons with a molecular extinction coefficient of about 16,500. It is represented by the structural formula

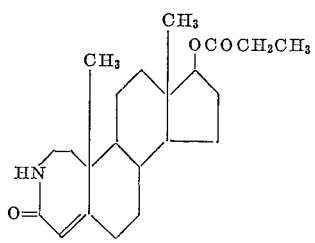

*Example 8*

To a solution of 1.08 parts of 3-aza-17β-propionoxy-A-homoandrost-4a-en-4-one in 40 parts of methanol is added 3 parts by volume of 4 N aqueous lithium hydroxide, and the resulting mixture is stored at room temperature for about 6 hours. To this mixture is then added successively one part of acetic acid and 50 parts of water, and the resulting aqueous solution is concentrated to a small volume under reduced pressure. The product crystallizes from this solution and is collected by filtration to afford crude 3-aza-17β-hydroxy-A-homoandrost-4a-en-4-one, which melts at about 278–281°. Recrystallization from ethanol affords needles of the pure substance melting at about 288–291°. It is characterized further by an ultraviolet absorption maximum at about 221 millimicrons with a molecular extinction coefficient of about 17,700. This substance is represented by the formula

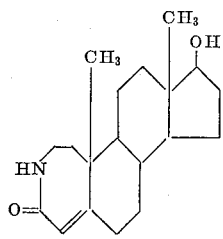

*Example 9*

To a solution of 29.7 parts of 17β-acetoxy-17α-methylandrost-4-en-3-one in 270 parts of pyridine is added a solution of 12 parts of hydroxylamine hydrochloride in 30 parts of water, and the resulting solution is heated on the steam bath for about one hour. The reaction mixture is then cooled and diluted with a large volume of water to afford a gummy product. This gummy mataining increasing proportions of ethyl acetate. The and the column is developed with benzene solutions containing inncreasing proportions of ethyl acetate. The 20% ethyl acetate in benzene eluate is evaporated to dryness and the resulting residue is purified by recrystallization from ethyl acetate-cyclohexane to produce 17β-acetoxy-17α-methylandrost-4-en-3-one oxime, M.P. about 148–155°. Recrystallization from ethyl acetatecyclohexane affords needles of the pure substance which melts at about 157–159°.

By substituting an equivalent quantity of 17β-acetoxy-17α-ethylandrost-4-en-3-one and otherwise proceeding according to the processes of this example, 17β-acetoxy-17α-ethylandrost-4-en-3-one oxime is obtained.

*Example 10*

To a solution of 3.6 parts of 17β-acetoxy-17α-methylandrost-4-en-3-one oxime in 80 parts of purified dioxane is added, with stirring and cooling by means of an ice bath, 2.36 parts of thionyl chloride. This reaction mixture is stored at room temperature for about one hour, then is diluted and stirred with about 80 parts by volume of 2 N aqueous potassium bicarbonate. Extraction with ethyl acetate affords an organic solution which is washed with dilute aqueous sodium sulfate, dried over anhydrous sodium sulfate, and concentrated to dryness at reduced pressure. The brownish residue is adsorbed on a silica gel chromatographic column and the column is developed with benzene and benzene-ethyl acetate mixtures. Evaporation to dryness of the 50% ethyl acetate in benzene eluate affords 17β-acetoxy-3-aza-17α-methyl-A-homoandrost-4a-en-4-one, which melts at about 250–252°. Purification of this crude product by crystallization from aqueous ethanol affords a sample of the pure substance melting at about 253–254°. It is characterized further by an ultraviolet absorption maximum at about 220 millimicrons with a molecular extinction coefficient of about 17,200. This compound is represented by the formula

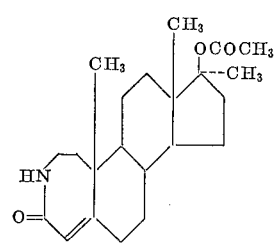

The substitution of an equivalent quantity of 17β-acetoxy-17α-ethylandrost-4-en-3-one oxime in the procedure of this example results in 17β-acetoxy-3-aza-17α-ethyl-A-homoandrost-4a-en-4-one.

*Example 11*

A mixture of 3.6 parts of 17β-acetoxy-3-aza-17α-methyl-A-homoandrost-4a-en-4-one and 225 parts by volume of 10% potassium hydroxide in methanol is stored at room temperature for about 48 hours. Neutralization of the mixture with acetic acid followed by dilution with about 400 parts of water affords an aqueous mixture, which is concentrated to approximately ½ volume under reduced pressure. The product which separates during the concentration is collected by filtration and dried to afford 3-aza-17β-hydroxy-17α-methyl-A-homoandrost-4a-en-4-one, melting at about 287–290°. Recrystallization from aqueous methanol affords a pure sample, obtained as needle-like crystals, and melting at about 291–293°. An ultraviolet absorption maximum is observed at about 221 millimicrons with a molecular extinction coefficient of about 17,100. It is characterized further by the formula

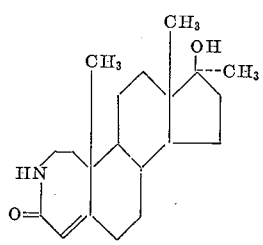

By substituting an equivalent quantity of 17β-acetoxy-3-aza-17α-ethyl-A-homoandrost-4a-en-4-one and otherwise proceeding according to the processes of this example, 3 - aza - 17α - ethyl - 17β - hydroxy - A - homoandrost-4a-en-4-one is obtained.

Example 12

A solution of 2.76 parts of 17β-acetoxy-17α-methyl-5α-androstan-3-one and 1.11 parts of hydroxylamine hydrochloride in 25 parts of pyridine is heated on the steam bath for about one hour, then is cooled and diluted with about 100 parts of water. The resulting precipitate is collected by filtration and dried to afford 17β-acetoxy-17α-methyl-5α-androstan-3-one oxime, melting at about 234–236°. Recrystallization from methanol results in needle-like crystals of the pure substance, M.P. about 235–237°.

The substitution of an equivalent quantity of 17β-acetoxy-17α-ethyl-5α-androstan-3-one in the processes of this example results in 17β-acetoxy-17α-ethyl-5α-androstan-3-one oxime.

Example 13

To a mixture of 2.3 parts of 17β-acetoxy-17α-methyl-5α-androstan-3-one oxime in 60 parts of purified dioxane is added 3.77 parts of thionyl chloride, and the resulting mixture is kept at room temperature for about one hour. To this reaction mixture is added with stirring, 60 parts by volume of 2 N aqueous potassium bicarbonate, and the resulting mixture is extracted with ethyl acetate. The organic extract is then washed with 10% aqueous sodium sulfate, is dried over anhydrous sodium sulfate, and is concentrated to dryness at reduced pressure. Crystallization of the white powdery residue from ethanol affords a mixture of 17β-acetoxy-3-aza-17αmethyl-A-homo-5α-androstan-4-one and 17β-avetoxy-4-aza-17α-methyl-A-homo-5α-androstan-3-one, which mixture melts at about 261–164°. Recrystallization from ethanol yields a pure sample of 17β-acetoxy-3-aza-17α-methyl-A-homo-5α-androstan-4-one, melting at about 275–276°. This substance is represented by the formula

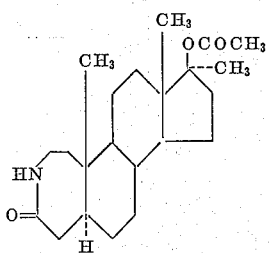

By substituting an equivalent quantity of 17β-acetoxy-17α-ethyl-5α-androstan-3-one oxime and otherwise proceeding according to the processes of this example, 17β-acetoxy-3-aza-17α-ethyl-A-homo-5α-androstan-4-one is obtained.

Example 14

To 70 parts of liquid ammonia is added successively a solution of 0.8 part of 3-aza-17β-hydroxy-17α-methyl-A-homoandrost-4a-en-4-one in 100 parts by volume of a 1:1 tertiary-butyl alcohol-tetrahydrofuran mixture, followed by 0.4 part of lithium wire. The resulting blue mixture is stirred for about 15 minutes, then is treated with ammonium chloride, and the ammonia is allowed to evaporate. The resulting residue is diluted with about 100 parts of water and the volatile organic material is distilled under reduced pressure. Extraction with ethyl acetate affords an organic solution which is washed with 10% aqueous sodium sulfate, is dried over anhydrous sodium sulfate, then is stripped of solvent at reduced pressure to afford 3-aza-17β-hydroxy-17α-methyl-A-homo-5α-androstan-4-one, melting at about 302–306°. Recrystallization from aqueous methanol yields plate-like crystals of the pure substance, melting at about 318–321°. It is further characterized by the formula

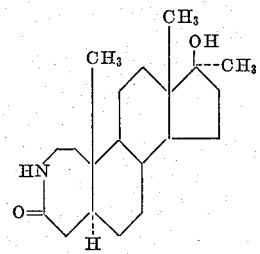

Example 15

A mixture of 1.08 parts of 17β-acetoxy-3-aza-17α-methyl-A-homo-5α-androstan-4-one and 17β-acetoxy-4-aza-17α-methyl-A-homo-5α-androstan-3-one, 6.7 parts of potassium hydroxide and 80 parts of methanol is kept at room temperature for about 48 hours, then is neutralized with acetic acid and diluted with about 200 parts of water. Evaporation of the methanol at reduced pressure affords a solid product, which is collected by filtration and dried to afford material melting at about 282–285°. Crystallization from aqueous ethanol affords a mixture of 3-aza-17β-hydroxy-17α-methyl-A-homo-5α-androstan-4-one and 4-aza-17β-hydroxy-17α-methyl-A-homo-5α-androstan-3-one. This mixture melts at about 287–290°. Chromatography of the mixture on silica gel followed by elution with ethyl acetate-benzene mixtures results in the individual pure substances. The 3-aza-17β-hydroxy-17α-methyl-A-homo-5α-androstan-4-one obtained is identical with that material produced in Example 14.

The substitution of an equivalent quantity of 17β-acetoxy-3-aza-17α-ethyl-5αandrostan-4-one in the procedure of this example results in 3-aza-17α-ethyl-17β-hydroxy-5α-androstan-4-one.

Example 16

A mixture of one part of 17β-hydroxy-A-norandrost-3-en-2-one, 10 parts of acetic anhydride, and 20 parts of pyridine is kept at room temperature for about 16 hours, then is poured into several volumes of cold water. The aqueous mixture is extracted with chloroform, and the organic layer is separated, washed successively with dilute hydrochloric acid and water, dried over anhydrous sodium sulfate, and concentrated to dryness to afford 17β-acetoxy-A-norandrost-3-en-2-one.

Example 17

The substitution of 14.3 parts of 17β-acetoxy-A-norandrost-3-en-2-one in the procedure of Example 6 results in 17β-acetoxy-A-norandrost-3-en-2-one oxime.

Example 18

By substituting 13.3 parts of 17β-acetoxy-A-norandrost-3-en-2-one oxime and otherwise proceeding according to the processes described in Example 7, 17β-acetoxy-2-azaandrost-4-en-3-one is obtained.

Example 19

A mixture of one part of 17β-acetoxy-2-azaandrost-4-en-3-one and 50 parts of 4% aqueous ethanolic sodium hydroxide is heated at reflux for about one hour, then is cooled and diluted with water. The organic solvent is distilled at reduced pressure, and the residual aqueous mixture is extracted with ether. The ether solution is dried over anhydrous sodium sulfate, then is concentrated to dryness to produce 17β-hydroxy-2-azaandrost-4-en-3-one, which substance is represented by the structural formula

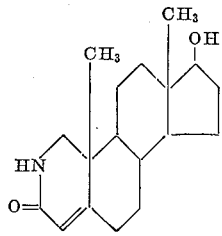

*Example 20*

To a solution of 1.26 parts of potassium tertiary-butoxide in 17 parts of tertiary-butyl alcohol is added one part of 2-aza-17β-hydroxy-5α-androstan-3-one, and the resulting mixture is stirred at room temperature for about 5 minutes. At the end of that time, 1.63 parts of methyl iodide are added, and that reaction mixture is heated at the reflux temperature, in a nitrogen atmosphere with stirring, for about 25 minutes. Approximately 3 parts of water is added, and the solvent is removed by distillation at reduced pressure. The resulting residue is partitioned between water and chloroform, and the organic layer is separated, then washed successively with dilute hydrochloric acid, dilute aqueous potassium bicarbonate, and water. Drying over anhydrous sodium sulfate followed by distillation of the solvent at reduced pressure affords the crude product. Crystallization of that substance from benzene yields 2-aza-17β-hydroxy-N-methyl-5α-androstan-3-one, melting at about 204–209° and characterized by the following structural formula

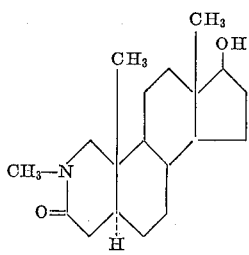

*Example 21*

To a solution of 1.89 parts of potassium tertiary-butoxide in 25 parts of tertiary-butyl alcohol is added one part of 2-aza-17β-hydroxy-17α-methyl-5α-androstan-3-one, and that mixture is stirred at room temperature for about 5 minutes, after which time 5.5 parts of methyl iodide is added. The resulting reaction mixture is stirred and heated at the reflux temperature in a nitrogen atmosphere for about 40 minutes, and approximately 3 parts of water is added to the cooled solution. Removal of the solvent by distillation under reduced pressure affords a residue to which is added a mixture of water and chloroform. The layers are separated, and the organic layer is washed successively with cold dilute hydrochloric acid, aqueous potassium bicarbonate, and water, then dried over anhydrous sodium sulfate and stripped of solvent at reduced pressure. The resulting crude product is purified by crystallization from benzene, thus affording 2-aza-17β-hydroxy-N,17α-dimethyl-5α-androstan-3-one, which melts at about 193.5–201° and is characterized further by the following structural formula

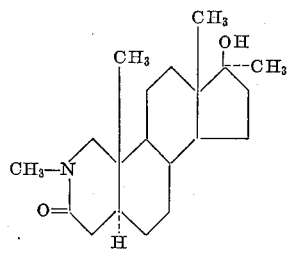

*Example 22*

To a solution of 2.83 parts of potassium tertiary-butoxide in 40 parts of tertiary-butyl alcohol is added 1.5 parts of 2-aza-17β-hydroxy-17α-methyl-5α-androstan-3-one, and that reaction mixture is stirred for about 5 minutes. A quantity of ethyl iodide amounting to 8.2 parts is then added, and the reaction mixture which results is stirred in a nitrogen atmosphere for about 35 minutes at the reflux temperature. Approximately 4 parts of water is then added, and the organic solvent is removed by distillation at reduced pressure. The resulting residue is partitioned between water and chloroform, and the organic layer is separated, washed successively with dilute hydrochloric acid, aqueous potassium bicarbonate, and water, then dried over anhydrous sodium sulfate and stripped of solvent by distillation at reduced pressure. The resulting crude product is purified by crystallization from ether-benzene to yield pure 2-aza-N-ethyl-17β-hydroxy-17α-methyl-5α-androstan-3-one, which melts at about 178.5–180.5°. It is further characterized by the following structural formula

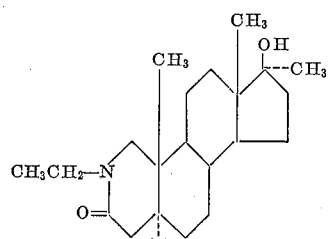

*Example 23*

To a solution of 0.95 part of 3-aza-17β-hydroxy-17α-methyl-A-homoandrost-4a-en-4-one in 40 parts of tertiary-butyl alcohol is added 2.79 parts of potassium tertiary-butoxide. To the resulting clear solution is added 4.26 parts of methyl iodide, and that reaction mixture is heated at the reflux temperature for about 30 minutes. The organic solvent is removed by distillation at reduced pressure, and the resulting residue is washed with water, then is collected by filtration, washed on the filter with water, and dried to afford the crude product, melting at about 155–156°. Recrystallization from aqueous methanol affords irregular prisms of 3-aza-17β-hydroxy-N-17α-dimethyl-A-homoandrost-4a-en-4-one, which displays a double melting point at about 156–157° and 179–180°. It is characterized further by an ultra-violet absorption maximum at about 220 millimicrons with a molecular extinction coefficient of about 16,000 and also by the following structural formula

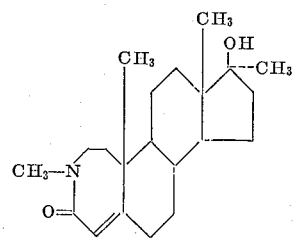

Example 24

The substitution of equivalent quantities of 3-aza-17α-ethyl-17β-hydroxy-A-homoandrost-4a-en-4-one and ethyl iodide in the procedure of Example 23 affords 3-aza-N,17α-diethyl-17β-hydroxy-A-homoandrost-4a-en-4-one, of the structural formula

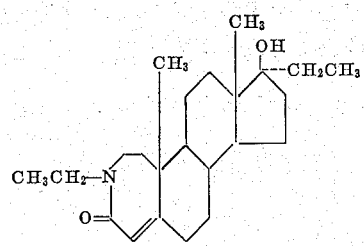

Example 25

By substituting an equivalent quantity of 2-aza-17α-ethyl-17β-hydroxy-5α-androstan-3-one and otherwise proceeding according to the processes described in Example 21, 2-aza-17α-ethyl-17β-hydroxy-N-methyl-5α-androstan-3-one of the structural formula

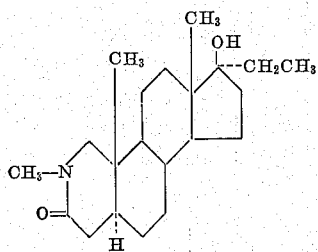

is obtained.

Example 26

A solution of 1.5 parts of 2-aza-17β-hydroxy-N-methyl-5α-androstan-3-one in 10 parts of pyridine containing 5 parts of acetic anhydride is allowed to stand at room temperature for about 16 hours, then is diluted with ice and water. The resulting aqueous mixture is allowed to warm to room tempreature, then is extracted with benzene. The organic layer is separated, washed successively with dilute hydrochloric acid, aqueous potassium bicarbonate, and water, then is dried over anhydrous sodium sulfate and stripped of the solvent by distillation at reduced pressure. The resulting gummy residue is extracted with hexane, and the extract is filtered, then is allowed to stand in order to effect crystallization. The prismatic crystals which form are collected by filtration and dried to afford pure 17β-ocetoxy-2-aza-N-methyl-5α-androstan-3-one, which displays a melting point at about 145–147.5° and can be represented by the structural formula

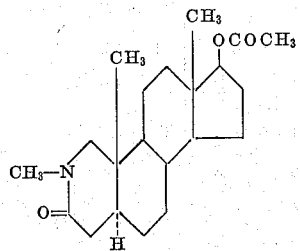

Example 27

A mixture of 5 parts of 2-aza-17β-hydroxy-5α-androstan-3-one, 50 parts of acetic anhydride, and 100 parts of pyridine is heated at about 90° for about 16 hours, then is cooled to 0–5° and stirred with a mixture of ice and water for about 15 minutes. The resulting precipitate is isolated by filtration, is washed on the filter with water, then is extracted with chloroform. The chloroform extract is washed successively with dilute hydrochloric acid, aqueous potassium bicarbonate, and water, then is dried over anhydrous sodium sulfate and concentrated to dryness at reduced pressure. The resulting residue is recrystallized from benzene to afford 17β-acetoxy-N-acetyl-2-aza-5α-androstan-3-one, melting at about 176.5–177.5°. It can be further characterized by the following structural formula

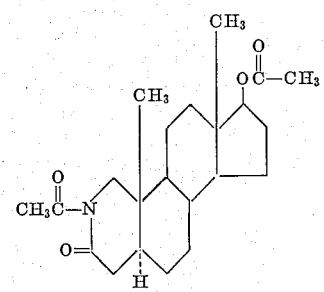

Example 28

To a solution of 1.48 parts of 2-aza-17β-hydroxy-N-methyl-5α-androstan-3-one in 160 parts of acetone is added, dropwise with stirring, 2.7 parts by volume of an aqueous solution, 8 N in chromium trioxide and 8 N in sulfuric acid. That reaction mixture is stirred at room temperature for about 3 minutes, after which time the excess oxidant is destroyed by the addition of a small quantity of isopropyl alcohol. Concentration of the mixture under reduced pressure affords a residue which is partitioned between chloroform and water. The chloroform layer is separated, washed successively with dilute aqueous sodium hydroxide and water, dried over anhydrous sodium sulfate, and evaporated to dryness at reduced pressure. Extraction of the residue with hot hexane and filtration of the extract affords a solution which, upon cooling, deposits crystals of pure 2-aza-N-methyl-5α-androstane-3,17-dione, melting at about 128–131°. It can be represented by the following structural formula

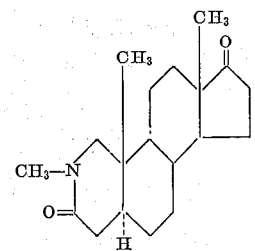

Example 29

A mixture of 2 parts of 2-aza-17β-hydroxy-5α-androstan-3-one, 10 parts of acetic anhydride, and 20 parts of pyridine is allowed to stand at room temperature for about 16 hours. The crystalline product which separates from the reaction mixture is isolated by filtration, washed on the filter with pyridine, and dried. Recrystallization of that crude product from a mixture of methylene chloride and benzene yields pure 17β-acetoxy-2-aza-5α-androstan-3-one, melting at about 275–280°. Its structural formula is shown below.

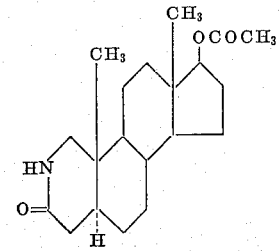

Example 30

The substitution of an equivalent quantity of 2-aza-17β-hydroxy-17α-methyl-5α-androstan-3-one in the procedure of Example 27 results in 17β-acetoxy-N-acetyl-2-aza-17α-methyl-5α-androstan-3-one.

*Example 31*

A mixture of one part of 2-aza-17β-hydroxy-17α-methyl-5α-androstan-3-one, 10 parts of acetic anhydride, and 20 parts of pyridine is heated at about 90° for about 5 hours, then is cooled and diluted with a mixture of ice and water. That aqueous mixture is extracted with chloroform, and the organic layer is separated, washed successively with dilute hydrochloric acid, aqueous potassium bicarbonate, and water, then dried over anhydrous sodium sulfate and concentrated to dryness at reduced pressure. Recrystallization of that crude product from benzene affords pure N-acetyl-2-aza-17β-hydroxy-17α-methyl-5α-androstan-3-one, represented by the structural formula

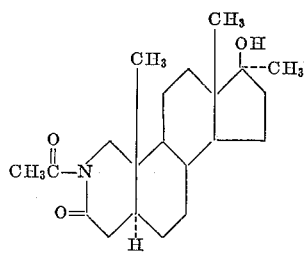

*Example 32*

The substitution of an equivalent quantity of propionic anhydride in the procedure described in Example 27 affords 2 - aza - 17β - propionoxy - N - propionyl - 5α-androstan-3-one.

*Example 33*

By substituting an equivalent quantity of propionic anhydride and otherwise proceeding according to the processes described in Example 29, 2-aza-17β-propionoxy-5α-androstan-3-one is obtained.

*Example 34*

The substitution of an equivalent quantity of propionic anhydride in the processes of Example 26 results in 2-aza-N-methyl-17β-propionoxy-5α-androstan-3-one.

*Example 35*

By substituting an equivalent quantity of ethyl iodide and otherwise proceeding according to the processes of Example 20, 2-aza-N-ethyl-17β-hydroxy-5α-androstan-3-one is obtained.

What is claimed is:
1. A compound of the formula

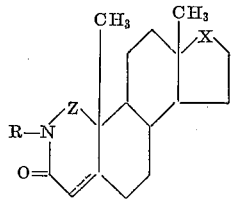

wherein Z is selected from the group of bivalent radicals consisting of methylene and ethylene, R is a member of the class selected from hydrogen and radicals of the group consisting of lower alkyl and alkanoyl, the dotted line indicates that the linkage between carbon atoms 4 and 5 is selected from the group consisting of a single bond and a double bond, X is selected from the group of radicals consisting of carbonyl, β-hydroxymethylene, α-(lower alkyl) - β - hydroxymethylene, β - (lower alkanoyl) oxymethylene and α - (lower alkyl) - β - (lower alkanoyl)-oxymethylene when Z is methylene, X is selected from the group of radicals consisting of carbonyl, β-hydroxymethylene, α-(lower alkyl) - β - hydroxymethylene, β-(lower alkanoyl)oxymethylene and α - (lower alkyl) - β-(lower alkanoyl)oxymethylene when the linkage between carbon atoms 4 and 5 is a double bond, and X is selected from the group consisting of α-(lower alkyl)-β-hydroxymethylene and α - (lower alkyl) - β - (lower alkanoyl) oxymethylene when Z is ethylene and the linkage between carbon atoms 4 and 5 is a single bond.

2. 2 - aza - 17β - hydroxy - 5α - androstan - 3 - one.
3. 3 - aza - 17β - propionoxy - A - homoandrost - 4a-en-4-one.
4. 3 - aza - 17β - hydroxy - A - homoandrost - 4a - en-4-one.
5. A compound of the formula

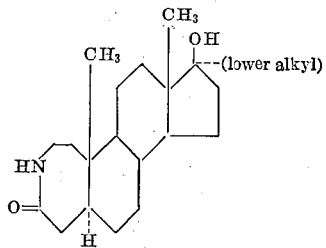

6. 3 - aza - 17β - hydroxy - 17α - methyl - A - homo-5α-androstan-4-one.
7. A compound of the formula

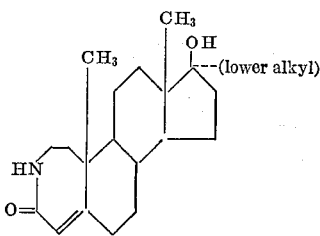

8. 3 - aza - 17β - hydroxy - 17α - methyl - A - homo-androst-4a-en-4-one.
9. A compound of the formula

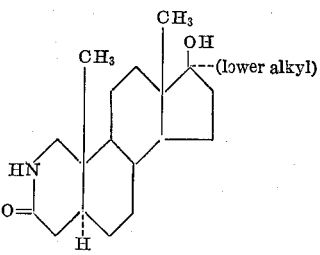

10. 2 - aza - 17β - hydroxy - 17α - methyl - 5α - androstan-3-one.
11. A compound of the formula

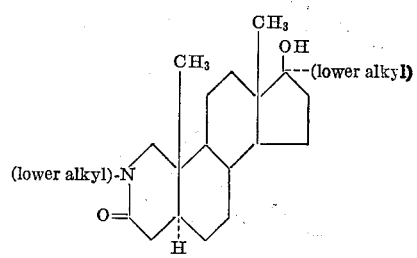

12. 2 - aza - 17β - hydroxy - N,17α - dimethyl - 5α-androstan-3-one.
13. A compound of the formula

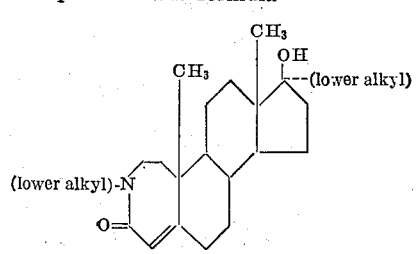

14. 3 - aza - 17β - hydroxy - N,17α - dimethyl - A-homoandrost-4a-en-4-one.

15. A compound of the formula

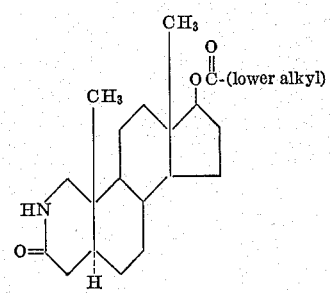

16. 17β - acetoxy - 2 - aza - 5α - androstan - 3 - one.

17. A compound of the formula

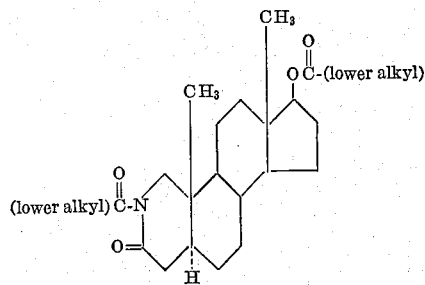

18. A compound of the formula

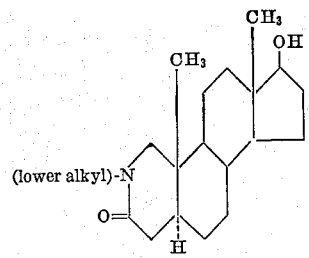

19. 2 - aza - 17β - hydroxy - N - methyl - 5α - androstan-3-one.

20. A compound of the formula

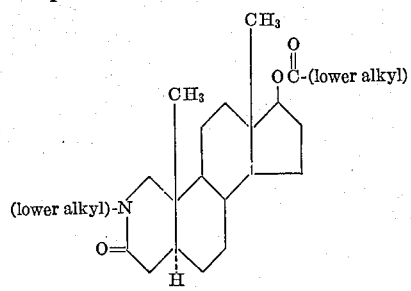

References Cited by the Examiner

UNITED STATES PATENTS 2,227,876   1/1941   Bolt _____ 260—289

OTHER REFERENCES

Doorenbos et al.: "J. Org. Chem.," vol. 26, pp. 4548–50 (1961).

WALTER A. MODANCE, *Primary Examiner.*

ROBERT T. BOND, *Assistant Examiner.*